United States Patent
Engelhardt et al.

(10) Patent No.: US 6,285,019 B1
(45) Date of Patent: Sep. 4, 2001

(54) OPTICAL ARRANGEMENT DISPOSED IN A MICROSCOPE BEAM PATH

(75) Inventors: Johann Engelhardt, Bad Schonborn; Christiane Ihrig, Mender, both of (DE)

(73) Assignee: Leica Microsystems Heidelberg GmbH (DE)

( * ) Notice: Subject to any disclaimer, the term of this patent is extended or adjusted under 35 U.S.C. 154(b) by 0 days.

(21) Appl. No.: 09/331,458

(22) PCT Filed: Dec. 12, 1997

(86) PCT No.: PCT/DE97/02895

§ 371 Date: Jul. 14, 1999

§ 102(e) Date: Jul. 14, 1999

(87) PCT Pub. No.: WO98/28646

PCT Pub. Date: Jul. 2, 1998

(30) Foreign Application Priority Data

Dec. 24, 1996 (DE) .............................................. 196 54 211

(51) Int. Cl.[7] ........................................................ H01J 3/14
(52) U.S. Cl. .......................................... 250/216; 250/234
(58) Field of Search ..................................... 250/216, 234, 250/235; 359/618, 629, 720–740, 637

(56) References Cited

U.S. PATENT DOCUMENTS 4,827,125 * 5/1989 Goldstein ............................. 250/216
5,161,053 * 11/1992 Dabbs .................................. 359/384
5,192,980 * 3/1993 Dixon et al. ......................... 356/326
5,334,830 * 8/1994 Fukuyama ............................ 250/216
5,563,710 * 10/1996 Webb et al. ......................... 356/445

FOREIGN PATENT DOCUMENTS

| 3804642 A1 | 2/1988 | (DE) . |
| PCT/DE95/ 01073 | 8/1995 | (WO) . |

* cited by examiner

*Primary Examiner*—Stephone B. Allen
(74) *Attorney, Agent, or Firm*—Simpson, Simpson & Snyder, PLLC

(57) ABSTRACT

The invention concerns an optical arrangement disposed in the beam path of a microscope, in particular a confocal scanning microscope, an illuminating pinhole diaphragm (6) and a detection pinhole diaphragm (7) being disposed in the illuminating beam path (1) between the light source (2) and object (3) and in the detection beam path (4) between the detector (5) and the object (3), respectively. In order to be able to carry out continuous depth discrimination and adapt itself optimally to lenses, wavelengths and efficiency, the optical arrangement is designed and developed such that a verifocal lens system (8) for varying the optically effective pinhole diaphragm diameter is provided at least between one of the pinhole diaphragms (6, 7) and the object (3).

17 Claims, 1 Drawing Sheet

OPTICAL ARRANGEMENT DISPOSED IN A MICROSCOPE BEAM PATH

BACKGROUND OF THE INVENTION

The invention concerns an optical system in the beam path of a microscope, specifically a confocal scanning microscope, such that one pinhole diaphragm, the illuminating pinhole, is placed in the illuminating beam between the light source and the object, and another, the detection pinhole, is placed in the detection beam path between the object and the detector.

Optical systems of the type being discussed here have been known in practice for a long time. As examples, we refer only to J. Engelhardt and W. Knebel,"Confocal Laser Scanning Microscopy in Physik in unserer Zeit [Physics in our time], Vol. 24, No. 2, pages 70–78 (1993); J. B. Pawley, in"Handbook of Biological Confocal Microscopy", 2d Edition, pp. 581 ff; and European Patent 0 280 375 B1.

In confocal scanning microscopy in particular, it is necessary to match the diameter of the confocal pinholes to the different magnifications of various microscope objectives. If the pinhole is too large, the resolution along the optical axis is reduced. If the pinhole is too small, on the other hand, the light transmission is reduced; and that is not tolerable, especially in fluorescence applications. Depending on the optical system, the usual pinholes have diameters in the range between 10 $\mu$m and 10 mm.

The use of adjustable iris diaphragms in very long beam paths is also already known in practice. These iris diaphragms can be motorized. Their minimum usable diameter is limited to about 0.1 mm, though.

For mechanical-geometrical reasons, and for both mechanical stability and adjustability, compact designs are preferred over long beam paths in order to produce confocal optical systems.

Pinholes with diameters of 5 to 500 $\mu$m are used with short light paths. The diameter can be changed by placing several pinholes, each with a fixed diameter, on a disk or wheel. In that way the pinhole diameter can be changed in discrete steps. This is quite difficult because of the small pinhole diameter and the essential positioning accuracy, as such an arrangement is extremely sensitive to adjustment.

A continuously adjustable pinhole is also already known in practice. In this case, two pairs of fine knife edges at right angles can be adjusted, by motorizing, to produce a continuously variable rhomboidal opening between 20 and 500 $\mu$m. However, smaller apertures cannot be produced by this known principle because of the micromechanical requirements.

SUMMARY OF THE INVENTION

This invention is based on the objective of designing and developing an optical system in the light path of a microscope, specifically a confocal scanning microscope, such that continuous depth discrimination and optimal matching of to the objective, wavelength, and transmission can be accomplished with simple means in the minimum construction.

The optical arrangement in the beam path of a microscope, specifically a confocal scanning microscope, according to the invention, solves the problem stated above by the features of Patent claim 1. According to that claim, an optical arrangement in the beam path of a microscope of the type under discussion here is designed and developed so that a varifocal optical system to vary the optically effective pinhole diameter is provided between at least one of the pinholes and the objective.

It is known according to the invention that one can utilize the advantage of a compact optical system, thus avoiding the disadvantages of a rectangular diaphragm which is not rotationally symmetric, with limited minimum diameter, by placing a varifocal system between at least one of the pinholes and the object to vary the optically effective pinhole diameter. The varifocal system varies the optically effective, or apparent, pinhole diameter. Thus the desired depth discrimination can be adjusted continuously by changing the magnification factor with a fixed focus adjustment, and there can be optimal match of the object, wavelength, and transmission.

As noted above, a varifocal system is provided between at least one of the pinholes and the object. The varifocal system can be effective only for the light source, only for the detector, or for both the light source and the detector. In the first design mentioned, the varifocal system can be placed between the illumination pinhole and a beamsplitter. If the varifocal system is to be effective only for the detector, it can be placed between the beamsplitter and the detection pinhole. In other words, one can place the varifocal system between the illuminating pinhole and the beamsplitter or object, or between the object or beamsplitter and the detection pinhole.

If the varifocal system is intended to be effective for both the light source and the detector, one could place the varifocal system between the beamsplitter and the object or place an object and/or a scanner in front of it. In any case, only a single varifocal system is needed in such an embodiment. It is placed in the common beam path between the light source and the objective, on one hand, and between the object and the detector, on the other hand.

As mentioned previously, an assembly of objective lenses can be placed in the beam path before the object. A scanner could, again, be placed in the usual manner in front of those objective lenses.

The varifocal optical system can, in a particularly advantageous manner, be a motorized zoom optical system. This can, again, be designed as a common zoom lens such as is used in video cameras, for instance. In any case, it is particularly advantageous if the magnification of the zoom lens can be varied with the focal plane fixed, or the focal plane can be varied with fixed magnification, so as to gain the optimal potential for variation.

The varifocal system can be designed so as to compensate for residual longitudinal chromatic aberrations of other optical components of the scanning microscope.

The second effect additionally allows variation of the focal plane by optical means without the need for moving the object in relation to the microscope objective. The advantage of that is that the dynamic effect of the viscosity of the oil in immersion microscopy has no effect on the focusing or on formation of images along the optical axis.

Another major advantage of the system according to the invention is that both the illuminating pinhole and the detection pinhole can be designed as pinholes with fixed diameters, so that no micromechanical system is needed here. The pinholes are preferably designed with circular beam paths so that the negative effect of variable rhomboidal apertures known in practice can be avoided. Effective diameters down to the diffraction limit can be achieved in conjunction with the varifocal optical system without expensive fine-mechanical technology, that is, only using pinholes with fixed circular diameters.

With respect to an alternative embodiment of the pinhole, it is conceivable that it could be the end of a light fiber, with such a concept possible both for the illumination pinhole and the detection pinhole. The light fiber could be designed as a monomode fiber.

The illumination pinhole could be represented directly by a sufficiently small light source, a short-arc lamp being particularly suitable.

The detection pinhole could, alternatively, be represented by a sufficiently small detector. A unidimensional or multi-dimensional array can be considered.

Now there are various possibilities for advantageously embodying and further developing the teaching of this invention. In that respect, reference is made to the claims subordinate to Patent claim 1, and to the following explanation of one embodiment of the invention by means of the drawing. Generally preferred embodiments and developments of the teaching are also explained in connection with the explanation of the preferred embodiment of the invention.

BRIEF DESCRIPTION OF THE DRAWINGS

In the drawing, the single figure shows schematically an example embodiment of an optical system according to the invention in the light path of a confocal scanning microscope, in which the scanning microscope is not shown for simplicity.

DETAILED DESCRIPTION OF THE PREFERRED EMBODIMENT

Figure 1:
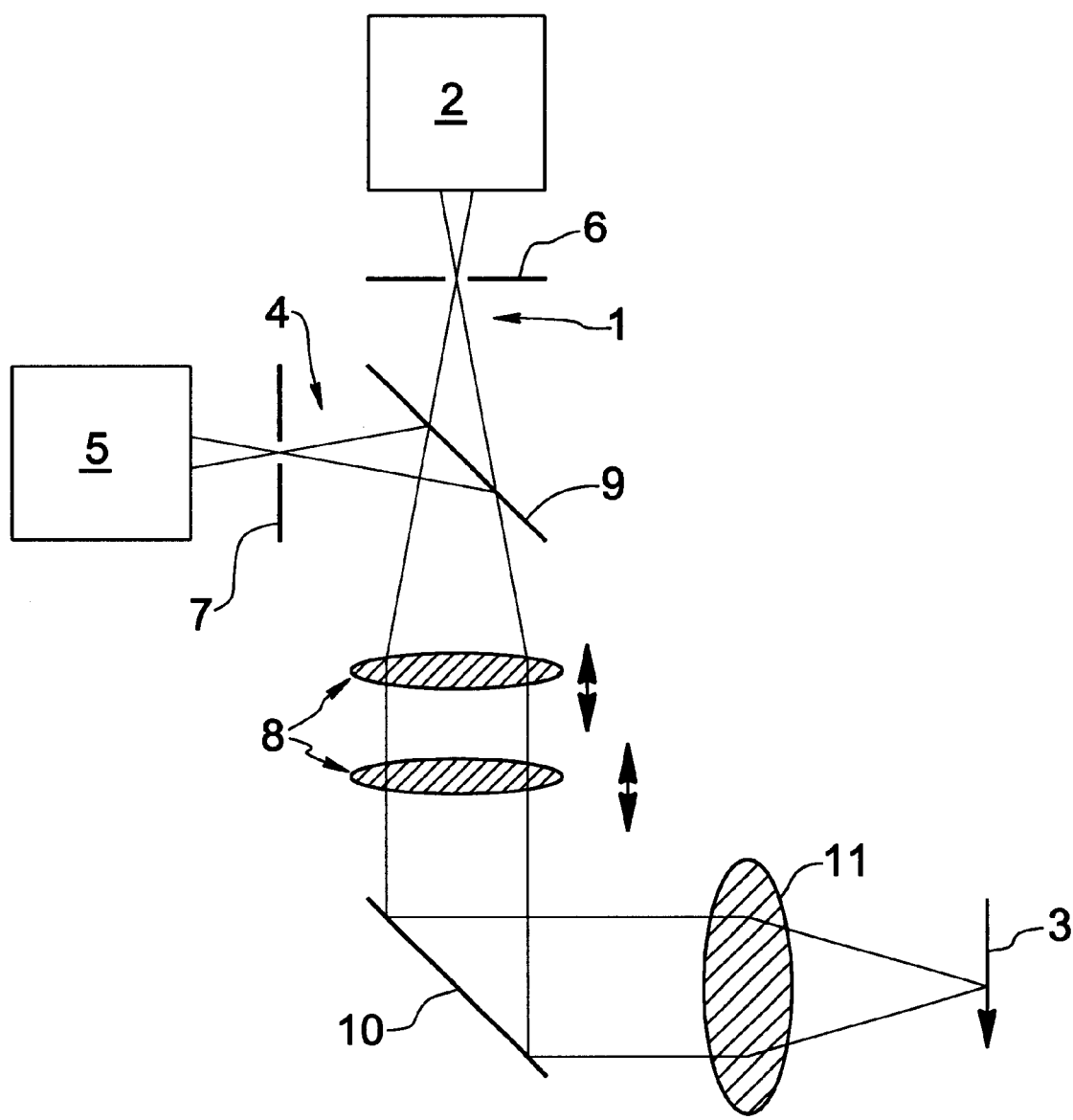

The figure shows an optical system in the beam path of a confocal scanning microscope. There is a pinhole, the illuminating pinhole 6, between the light source 2 and object 3 in the illuminating beam path 1, and a detection pinhole 7 between the object 3 and the detector 5 in the detection beam path 4.

According to the invention there is a varifocal optical system 8 between pinholes 6, 7 and the object 3, to vary the optically effective pinhole diameter. In the specific system chosen here, this varifocal system is between the beamsplitter 9 and the object 3, so that it is effective for both the light source 2 and the detector 5. In the specific example, the varifocal optical system 8 is followed by a scanner 10, simplified here as a scanning and deflecting mirror, and an assembly of objectives 11.

The varifocal optical system 8 is a motorized zoom optical system such as is used in video cameras. With it, the magnification can be varied with a fixed focal plane, or the focal plane can be varied with fixed magnification.

Both the illumination pinhole 6 and the detection pinhole 7 are made as circular pinholes with fixed diameters. The variation of the optically effective pinhole diameter is accomplished solely by the varifocal optical system 8.

The varifocal optical system 8 is used to adjust the position of focus, or for continuous variation of the focus, so as to produce images along the optical axis. With respect to alternative embodiments of the pinholes, reference is made to the general part of the description to avoid repetition.

List of Reference Numbers

1 Illumination beam path (light source to object)
2 Light source
3 Object
4 Detection beam path (object to detector)
5 Detector
6 Illumination pinhole
7 Detection pinhole
8 Varifocal optical system
9 Beamsplitter
10 Scanner
11 Objective lens

What is claimed is:

1. An optical system in a light path of a confocal microscope, said confocal microscope having a light source and a detector, an illumination light path between said light source and an object and a detection light path between said object and said detector, and an illuminating pinhole in the illumination light path and a detecting pinhole in said detection light path, said optical system comprising:
   a beamsplitter in said illumination optical path between said illuminating pinhole and said object and in said detection optical path between said object and said detecting pinhole;
   a single magnifying optical system between said beamsplitter and said object, said magnifying optical system being effective for said light source to vary the optically effective pinhole diameter of said illuminating pinhole and effective for said detector to vary the optically effective pinhole diameter of said detecting pinhole.

2. The optical system according to claim 1, further comprising a scanner and an assembly of objective lenses in said illuminating light path in front of said object.

3. The optical system according to claim 1, wherein said magnifying optical system is designed to compensate residual axial chromatic aberrations of other optical components of said microscope.

4. The optical system according to claim 1, wherein said magnifying optical system is a motorized zoom optical system.

5. The optical system according to claim 4, wherein said zoom optical system is a zoom optical system which functions as the zoom optical system of a video camera.

6. The optical system according to claim 4, wherein said zoom optical system can vary magnification with a fixed focal plane location, and can vary focal plane location with fixed magnification.

7. The optical system according to claim 1, wherein said illuminating pinhole is a circular pinhole having a fixed diameter.

8. The optical system according to claim 1, wherein said detecting pinhole is a circular pinhole having a fixed diameter.

9. The optical system according to claim 7, wherein said illuminating pinhole is represented by an end of an optical fiber.

10. The optical system according to claim 8, wherein said detecting pinhole is represented by an end of an optical fiber.

11. The optical system according to claim 9, wherein said optical fiber is a monomode fiber.

12. The optical system according to claim 10, wherein said optical fiber is a monomode fiber.

13. The optical system according to claim 1, wherein said illuminating pinhole is directly represented by said light source being sufficiently small.

14. The optical system according to claim 13, wherein said light source is a short-arc lamp.

15. The optical system according to claim 1, wherein said detecting pinhole is directly represented by said detector being sufficiently small.

16. The optical system according to claim 15, wherein said detector is a unidimensional array.

17. The optical system according to claim 15, wherein said detector is a multidimensional array.

* * * * *